United States Patent
Hongawara et al.

(10) Patent No.: US 11,203,259 B2
(45) Date of Patent: Dec. 21, 2021

(54) POWER TRAIN DEVICE OF VEHICLE

(71) Applicant: Mazda Motor Corporation, Hiroshima (JP)

(72) Inventors: Narihito Hongawara, Hiroshima (JP); Takuya Sugisawa, Aki-gun (JP); Keitaro Kageyama, Higashihiroshima (JP); Satoshi Fujikawa, Aki-gun (JP); Hiroki Tanabe, Hiroshima (JP); Shingo Kodama, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 44 days.

(21) Appl. No.: 16/806,528

(22) Filed: Mar. 2, 2020

(65) Prior Publication Data

US 2020/0332886 A1 Oct. 22, 2020

(30) Foreign Application Priority Data

Apr. 22, 2019 (JP) .............................. JP2019-081056

(51) Int. Cl.
| | |
|---|---|
| *B60K 6/365* | (2007.10) |
| *F16H 61/16* | (2006.01) |
| *B60K 6/547* | (2007.10) |
| *B60K 6/383* | (2007.10) |
| *B60W 10/02* | (2006.01) |

(Continued)

(52) U.S. Cl.
CPC .............. *B60K 6/365* (2013.01); *B60K 6/383* (2013.01); *B60K 6/547* (2013.01); *B60W 10/02* (2013.01); *B60W 10/06* (2013.01); *B60W 10/115* (2013.01); *B60W 30/192* (2013.01); *F16H 61/16* (2013.01); *B60K 6/387* (2013.01); *B60K 2006/268* (2013.01); *B60K 2006/4825* (2013.01); *B60W 2030/206* (2013.01); *B60W 2710/021* (2013.01); *B60W 2710/081* (2013.01); *F16H 3/663* (2013.01); *F16H 2061/0411* (2013.01); *F16H 2312/20* (2013.01)

(58) Field of Classification Search
CPC .... B60W 10/02; B60W 10/06; B60W 10/115; B60W 30/192; B60W 2030/206; F02N 2200/0802
See application file for complete search history.

(56) References Cited

U.S. PATENT DOCUMENTS

| | | | |
|---|---|---|---|
| 11,028,778 B2 * | 6/2021 | Brito | F02C 7/268 |
| 2003/0203790 A1 * | 10/2003 | Matsubara | F16H 61/143 |
| | | | 477/107 |

(Continued)

FOREIGN PATENT DOCUMENTS

WO 2016063857 A1 4/2016

Primary Examiner — David R Morris
(74) Attorney, Agent, or Firm — Alleman Hall Creasman & Tuttle LLP

(57) ABSTRACT

A power train device of a vehicle includes an engine and an automatic transmission. The automatic transmission is configured such that in a neutral state, multiple ones of multiple rotary elements forming a power transmission path other than a rotary element coupled to an input member and a rotary element coupled to an output member are in a non-restraining state. The multiple ones of the multiple rotary elements include a rotary element of a predetermined brake among multiple friction fastening elements, and the predetermined brake is fastened before a fuel supply upon an engine start.

6 Claims, 8 Drawing Sheets

(51) Int. Cl.
  *B60W 10/06*    (2006.01)
  *B60W 10/115*   (2012.01)
  *B60W 30/192*   (2012.01)
  *F16H 61/04*    (2006.01)
  *F16H 3/66*     (2006.01)
  *B60K 6/26*     (2007.10)
  *B60K 6/48*     (2007.10)
  *B60K 6/387*    (2007.10)
  *B60W 30/20*    (2006.01)

(56)         References Cited

U.S. PATENT DOCUMENTS

2009/0166109 A1* 7/2009 Duan .................... B60W 10/08
                                                  180/65.28
2015/0219214 A1* 8/2015 Kawamoto ......... F02N 11/0818
                                                  701/51
2017/0284516 A1   10/2017 Kamada et al.

* cited by examiner

|   |              | CL1 | CL2 | CL3 | BR1 | BR2 |
|---|--------------|-----|-----|-----|-----|-----|
| D | FIRST GEAR   | ○   |     |     | ○   | ○(△) |
|   | SECOND GEAR  |     | ○   |     | ○   | ○   |
|   | THIRD GEAR   | ○   | ○   |     |     | ○   |
|   | FOURTH GEAR  |     | ○   | ○   |     | ○   |
|   | FIFTH GEAR   | ○   |     | ○   |     | ○   |
|   | SIXTH GEAR   | ○   | ○   | ○   |     |     |
|   | SEVENTH GEAR | ○   |     | ○   | ○   |     |
|   | EIGHTH GEAR  |     | ○   | ○   | ○   |     |
| R | REVERSE GEAR |     |     | ○   | ○   | ○(△) |

POWER TRAIN DEVICE OF VEHICLE

CROSS-REFERENCE TO RELATED APPLICATIONS

This application claims priority to Japanese Patent Application No. 2019-081056 filed on Apr. 22, 2019, the entire disclosure of which is incorporated by reference herein.

TECHNICAL FIELD

The technique disclosed herein relates to a power train device of a vehicle including an engine and an automatic transmission.

BACKGROUND

Generally, an automatic transmission mounted on a vehicle has multiple planetary gear sets (planetary gear mechanisms) and multiple friction fastening elements such as a clutch and a brake. The automatic transmission selectively fastens the multiple friction fastening elements to selectively switch a power transmission path routed through each planetary gear mechanism, thereby achieving a gear stage corresponding to an operation state of the vehicle.

For example, an automatic transmission described in International Publication No. 2016/063857 has four planetary gear mechanisms and five friction fastening elements including three clutches and two brakes. This automatic transmission selectively fastens three of these friction fastening elements to achieve eight forward gears and a single reverse gear.

SUMMARY

In a vehicle equipped with a power train device including an engine and an automatic transmission, cranking of the engine is performed by a motor such as a stator motor upon the start of the engine. At predetermined timing, fuel is supplied to and ignited in the engine. For example, when an engine speed increases to an idling rotation speed, it is determined as complete explosion, and therefore, the engine start is completed. The engine transitions to idling operation.

The automatic transmission coupled to the engine is, upon the start of the engine, maintained in a neutral state in which no power is transmitted to a drive wheel from the engine by bringing multiple friction fastening elements into a release state. Upon the start of the vehicle after the start of the engine, the friction fastening element forming a first gear of a gear stage is fastened such that power is transmitted to the drive wheel from the engine through a power transmission path of the automatic transmission.

In the vehicle equipped with the engine, torque fluctuation is caused at an output shaft of the engine due to intermittent explosion in each cylinder of the engine. For example, in an in-line four-cylinder four-cycle engine, the torque fluctuation is caused twice while the output shaft of the engine rotates once, and such torque fluctuation is transmitted to the automatic transmission from the engine. Particularly, such torque fluctuation is great until complete explosion after ignition of fuel upon the engine start with a low engine speed.

Upon the start of the engine, the automatic transmission is in the neutral state, and among multiple rotary elements forming the power transmission path for transmitting power to the drive wheel from the engine, has multiple rotary elements in a non-restraining state (a free state) other than a rotary element coupled to an input member connected to the engine and a rotary element coupled to an output member connected to the drive wheel.

The multiple rotary elements in the non-restraining state when the automatic transmission is the neutral state are rotated in association with stop or rotation of other rotary elements. When the torque fluctuation of the engine is transmitted to the rotary element from an input member side of the automatic transmission coupled to the engine without a hydraulic power transmission device, the rotary element itself is also subjected to the torque fluctuation.

In recent years, tendency shows that the number of gear stages of the automatic transmission has increased. When the number of planetary gear mechanisms or friction fastening elements increases in association with an increase in the number of stages of the automatic transmission, the weight of each rotary element might increase, and the inertial mass of the rotary element in the non-restraining state when the automatic transmission is in the neutral state might increase.

If the inertial mass of the rotary element of the planetary gear mechanism in the non-restraining state when the automatic transmission is in the neutral state increases, when the torque fluctuation of the engine is transmitted from an input element of the planetary gear mechanism on an input member side of the automatic transmission, the rotary element serves as a reaction element, and the torque fluctuation is transmitted to an output element of the planetary gear mechanism on an output member side of the automatic transmission. This leads to a probability that the torque fluctuation is transmitted to the output member side of the automatic transmission.

There is a probability that when the torque fluctuation of the engine is transmitted to the output member side of the automatic transmission, the torque fluctuation is transmitted to the drive wheel from the output member of the automatic transmission and causes vibration of a vehicle body. Particularly, upon the start of the engine, the torque fluctuation of the engine is great. For this reason, there is a probability that the torque fluctuation of the engine is transmitted to the output member side of the automatic transmission and causes vibration of the vehicle body.

In a hybrid vehicle configured such that a motor is provided between an engine and an automatic transmission and a drive wheel is driven by at least one of the engine or the motor, there is also a probability that torque fluctuation of the engine is transmitted to an output member side of the automatic transmission upon the start of the engine and causes vibration of a vehicle body.

Considering, e.g., fuel economy performance, it has been considered that in an automatic transmission, a hydraulic power transmission device is not provided between the automatic transmission and an engine and at least one vehicle-start friction fastening element fastened with a first gear of a gear stage upon the vehicle start, preferably a vehicle-start brake, is slip-controlled to achieve smooth vehicle start. However, in a vehicle equipped with a power train device including such an automatic transmission, there is also a probability that torque fluctuation of the engine is transmitted to an output member side of the automatic transmission upon the start of the engine and causes vibration of a vehicle body.

The technique disclosed herein reduces torque fluctuation of an engine transmitted to an output side of an automatic transmission upon the start of the engine in a power train device including the engine and the automatic transmission.

The technique disclosed herein relates to a power train device of a vehicle including an engine and an automatic transmission including multiple planetary gear mechanisms and multiple friction fastening elements and forming a power transmission path for transmitting power from the engine to a drive wheel.

The automatic transmission is configured such that in a neutral state, multiple ones of multiple rotary elements forming the power transmission path other than a rotary element coupled to an input member and a rotary element coupled to an output member are in a non-restraining state.

The multiple ones of the multiple rotary elements include a rotary element of a predetermined brake among the multiple friction fastening elements.

The predetermined brake is fastened before a fuel supply upon the engine start.

According to such a configuration, in the power train device of the vehicle including the engine and the automatic transmission, the automatic transmission is configured such that in the neutral state, the multiple rotary elements other than the rotary element coupled to the input member and the rotary element coupled to the output member are in the non-restraining state. The multiple rotary elements include the rotary element of the predetermined brake, and the predetermined brake is fastened before the fuel supply upon the engine start.

With this configuration, the rotary elements including the rotary element of the predetermined brake in the non-restraining state when the automatic transmission is in the neutral state are fixed before the fuel supply upon the engine start. Thus, as compared to the case of not fastening the predetermined brake, when torque fluctuation of the engine is input to the automatic transmission upon the engine start, the inertial mass of the rotary element as a reaction element against the torque fluctuation of the engine can be reduced, and the torque fluctuation of the engine transmitted to an output side of the automatic transmission upon the engine start can be reduced.

A clutch to be fastened upon a non-supply of hydraulic pressure and released upon a supply of the hydraulic pressure may be provided between the engine and the automatic transmission.

The clutch may be fastened upon the engine start.

With this configuration, in the case of providing a normal close type clutch between the engine and the automatic transmission, the torque fluctuation of the engine transmitted to the output side of the automatic transmission upon the engine start can be reduced.

The predetermined brake may be fastened by an electric oil pump before the fuel supply upon the engine start.

With this configuration, the hydraulic pressure can be supplied to the predetermined brake by means of the electric oil pump before the engine start, and the predetermined brake can be fastened.

The predetermined brake may be fastened before the fuel supply upon the engine start, and may be fastened after the engine start.

With this configuration, even after the engine start, the inertial mass of the rotary element as the reaction element against the torque fluctuation of the engine can be reduced, and the torque fluctuation of the engine transmitted to the output side of the automatic transmission can be reduced.

The power train device of the vehicle further includes a motor configured to rotate the engine and drive the drive wheel.

The motor is provided between the engine and the automatic transmission.

The clutch to be fastened upon the non-supply of the hydraulic pressure and released upon the supply of the hydraulic pressure and a one-way clutch configured to transmit power only to the motor are provided in parallel between the engine and the motor.

The power train device of the vehicle is a power train device of a hybrid vehicle configured such that a drive wheel is driven by at least one of an engine or a motor.

With this configuration, in a power train device of a hybrid vehicle, an engine can be started by a motor through a clutch, and power can be transmitted to an automatic transmission from the engine through a one-way clutch after the engine start. Thus, as compared to the case of transmitting power to the automatic transmission from the engine through the clutch without using the one-way clutch, the transmission torque capacity of the clutch can be decreased, and the clutch can be configured compact.

The power train device of the vehicle further includes a motor configured to rotate the engine.

Upon the engine start, the engine is started after the motor increases an engine speed to a predetermined cranking rotation speed as higher rotation than a predetermined resonant rotation speed with which a drive system from the engine to the drive wheel resonates and lower rotation than a predetermined idling rotation speed.

With this configuration, as compared to the case of starting the engine with a lower engine speed than the resonant rotation speed of the drive system, a rotation speed difference between the engine speed at the beginning of the engine start and the idling rotation speed is decreased so that the torque fluctuation of the engine input to the automatic transmission upon the engine start can be reduced, and the torque fluctuation of the engine transmitted to the output side of the automatic transmission upon the engine start can be reduced. Moreover, an increase in vibration of the drive system due to resonance with the torque fluctuation of the engine upon the engine start can be suppressed.

DETAILED DESCRIPTION

Hereinafter, embodiments of the technique disclosed herein will be described with reference to the attached drawings.

Figure 1:
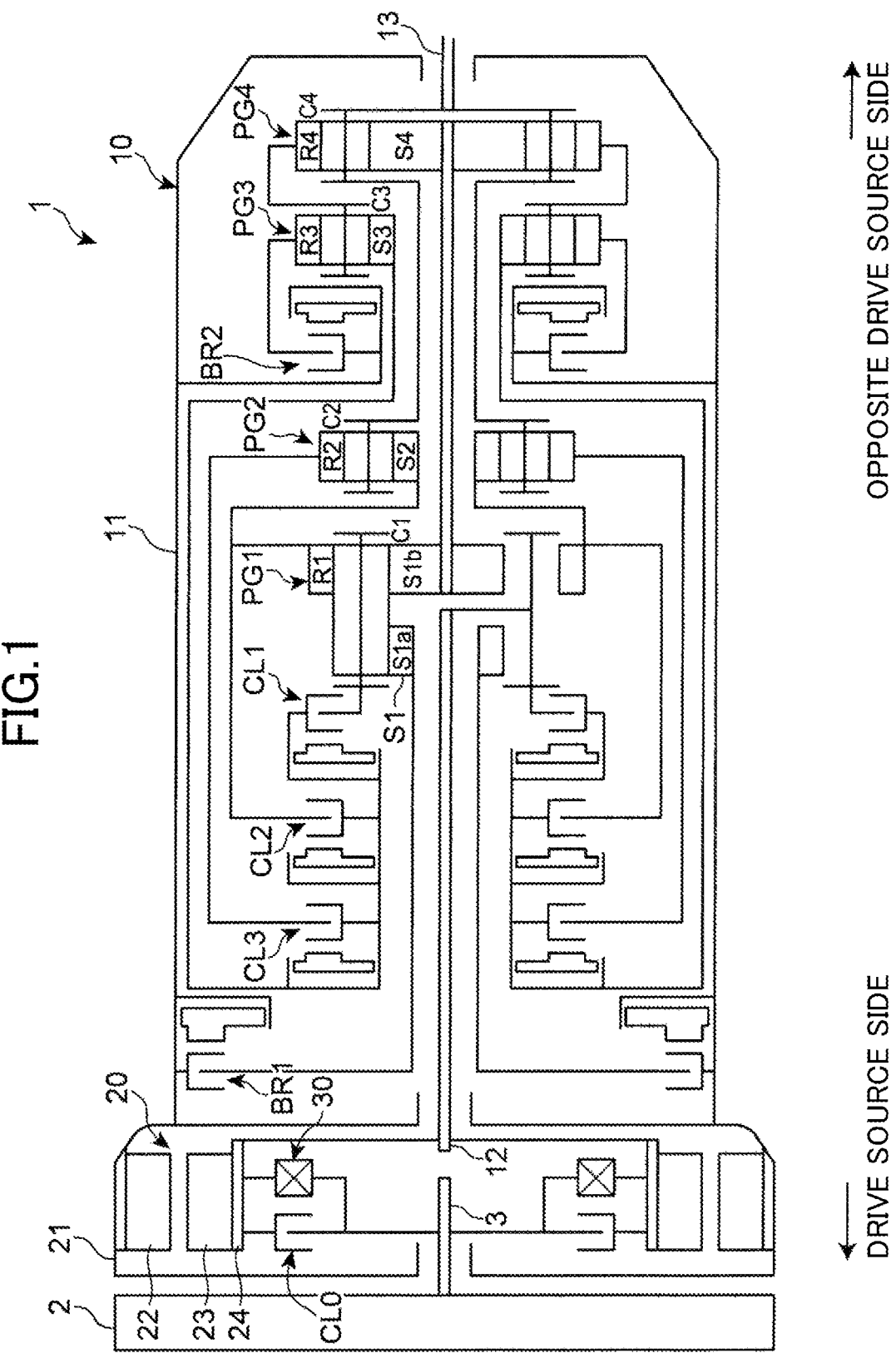
FIG. 1 is a skeleton diagram illustrating a power train device of a vehicle according to a first embodiment.

FIG. 1 is a skeleton diagram illustrating a power train device of a vehicle according to a first embodiment. As illustrated in FIG. 1, the power train device 1 according to the first embodiment includes an engine 2, an automatic transmission 10, and a motor (a drive motor) 20. The automatic transmission 10 is coupled to the engine 2 without a hydraulic power transmission device such as a torque converter. The motor 20 is arranged between the engine 2 and the automatic transmission 10. The power train device is mounted on a hybrid vehicle. The hybrid vehicle is configured such that a rear wheel as a drive wheel is driven by at least one of the engine 2 or the motor 20 through the automatic transmission 10.

The engine 2 is, but not be limited to, an in-line four-cylinder engine configured such that four cylinders are arranged in series. Torque fluctuation is caused twice while a crankshaft as an output shaft 3 of the engine 2 rotates once.

The motor 20 has a stator 22 and a rotor 23. The stator 22 is fixed to a housing 21 joined to a transmission case 11. The rotor 23 is supported by a rotor support member 24 joined to an input shaft 12 as an input member of the automatic transmission 10, and is arranged inside the stator 22 in a radial direction.

The stator 22 is configured such that a coil is wound around a stator core formed of a magnetic body. The rotor 23 is made of a tubular magnetic body. The motor 20 is configured such that when power is supplied to the stator 22, the rotor 23 is rotated by magnetic force generated by the stator 22.

A power disconnection/connection clutch CL0 and a one-way clutch 30 are provided in parallel between the engine 2 and the one-way clutch 30, specifically between the output shaft 3 of the engine 2 and the rotor support member 24 joined to the input shaft 12 of the automatic transmission 10. The power disconnection/connection clutch CL0 is capable of disconnecting/connecting the output shaft 3 of the engine 2 and the rotor support member 24.

A normal close type clutch is used as the power disconnection/connection clutch CL0, and the power disconnection/connection clutch CL0 has an outer rotary member, an inner rotary member, multiple friction plates, a piston, a spring, and a hydraulic chamber. The outer rotary member is joined to the rotor support member 24. The inner rotary member is joined to the output shaft 3 of the engine 2. The multiple friction plates are arranged between the outer rotary member and the inner rotary member. The piston presses the multiple friction plates. The spring biases the piston in a fastening direction. Hydraulic pressure for biasing the piston in a releasing direction against biasing force of the spring is supplied to the hydraulic chamber.

The power disconnection/connection clutch CL0 is fastened in such a manner that the piston is biased in the fastening direction by the spring in a hydraulic pressure non-supply state, and is released in such a manner that the piston is biased in the releasing direction by the hydraulic pressure against the biasing force of the spring in a hydraulic pressure supply state. The power disconnection/connection clutch CL0 is fastened so that power can be transmitted between the engine 2 and each of the automatic transmission 10 and the motor 20.

The one-way clutch 30 is configured to transmit power from the engine 2 only to the automatic transmission 10 and not to transmit power from the automatic transmission 10 and the motor 20 to the engine 2. For example, a sprag clutch having an outer race, an inner race, and multiple sprags can be used as the one-way clutch 30. The outer race is joined to the rotor support member 24. The inner race is joined to the output shaft 3 of the engine 2. The multiple sprags are interposed between the outer race and the inner race.

The power train device 1 includes a starter motor 67 (see FIG. 5) at the engine 2. In the power train device 1, the engine 2 is, upon the start thereof, rotated and started using the starter motor 67. The power disconnection/connection clutch CL0 can be fastened to rotate and start the engine 2 by the motor 20 through the power disconnection/connection clutch CL0.

The power train device 1 is configured such that after the start of the engine, the power disconnection/connection clutch CL0 is released and power is transmitted from the engine 2 to the automatic transmission 10 by the engine 2 through the one-way clutch 30. Moreover, the power train device 1 can be configured such that power is transmitted to the automatic transmission 10 by the motor 20.

Further, the motor 20 can be driven to perform regenerative power generation upon deceleration of the vehicle, and can supply the generated power to, e.g., a not-shown battery. In the power train device 1, the power disconnection/connection clutch CL0 is released upon deceleration of the vehicle so that power generation by the motor 20 can be efficiently performed.

The automatic transmission 10 has, in the transmission case 11, the input shaft 12 as the input member, an output shaft 13 as an output member, multiple planetary gear sets (planetary gear mechanisms), and multiple friction fastening elements such as clutches or brakes. The automatic transmission 10 is of a longitudinally-mounted type for, e.g., a front-engine rear-drive vehicle configured such that the input shaft 12 and the output shaft 13 are arranged on the same axis. The input shaft 12 is connected to the engine 2, and is arranged on a drive source side. The output shaft 13 is connected to the rear wheel, and is arranged on an opposite drive source side. The multiple planetary gear sets are arranged on the axis of the input shaft 12.

The automatic transmission 10 forms a power transmission path for transmitting power from the engine 2 to the rear wheel. The automatic transmission 10 is configured to selectively fasten the multiple friction fastening elements to selectively switch the power transmission path routed through each planetary gear mechanism, thereby achieving a gear stage corresponding to an operation state of the vehicle.

On the shaft centers of the input shaft 12 and the output shaft 13 of the automatic transmission 10, first, second, third, and fourth planetary gear sets (hereinafter merely referred to as "first, second, third, and fourth gear sets") PG1, PG2, PG3, PG4 are arranged in this order from the drive source side.

In the transmission case 11, a first clutch CL1 is arranged on the drive source side of the first gear set PG1, a second clutch CL2 is arranged on the drive source side of the first clutch CL1, and a third clutch CL3 is arranged on the drive source side of the second clutch CL2. Moreover, a first brake BR1 is arranged on the drive source side of the third clutch CL3, and a second brake BR2 is arranged on the drive source side of the third gear set PG3 and the opposite drive source side of the second gear set PG2.

Any of the first, second, third, and fourth gear sets PG1, PG2, PG3, PG4 is of a single pinion type configured such that a pinion supported on a carrier directly engages with a sun gear and a ring gear. Each of the first, second, third, and fourth gear sets PG1, PG2, PG3, PG4 has, as rotary elements, a sun gear S1, S2, S3, S4, a ring gear R1, R2, R3, R4, and a carrier C1, C2, C3, C4.

The first gear set PG1 is of a double sun gear type configured such that the sun gear S1 is divided in two in an axial direction. The sun gear S1 has a first sun gear S1*a* and a second sun gear S1b. The first sun gear S1a is arranged on the drive source side. The second sun gear S1b is arranged on the opposite drive source side. The first and second sun gears S1a, S1b have the same number of teeth, and engage with the same pinion supported on the carrier C1. With this configuration, the first and second sun gears S1a, S1b simultaneously rotate at the same speed.

In the automatic transmission 10, the sun gear S1 of the first gear set PG1, specifically the second sun gear S1b, and the sun gear S4 of the fourth gear set PG4 are constantly coupled to each other, the ring gear R1 of the first gear set PG1 and the sun gear S2 of the second gear set PG2 are constantly coupled to each other, the carrier C2 of the second gear set PG2 and the carrier C4 of the fourth gear set PG4 are constantly coupled to each other, and the carrier C3 of the third gear set PG3 and the ring gear R4 of the fourth gear set PG4 are constantly coupled to each other.

The input shaft 12 is constantly coupled to the carrier C1 of the first gear set PG1 through a portion between the first sun gear S1a and the second sun gear S1b, and the output shaft 13 is constantly coupled to the carrier C4 of the fourth gear set PG4.

The first clutch CL1 is arranged between each of the input shaft 12 and the carrier C1 of the first gear set PG1 and the sun gear S3 of the third gear set PG3, thereby disconnecting/connecting these components. The second clutch CL2 is arranged between each of the ring gear R1 of the first gear set PG1 and the sun gear S2 of the second gear set PG2 and the sun gear S3 of the third gear set PG3, thereby disconnecting/connecting these components. The third clutch CL3 is arranged between the ring gear R2 of the second gear set PG2 and the sun gear S3 of the third gear set PG3, thereby disconnecting/connecting these components.

The first brake BR1 is arranged between the transmission case 11 and the sun gear S1 of the first gear set PG1, specifically the first sun gear S1a, thereby disconnecting/connecting these components. The second brake BR2 is arranged between the transmission case 11 and the ring gear R3 of the third gear set PG3, thereby disconnecting/connecting these components.

Figures 2, 3:
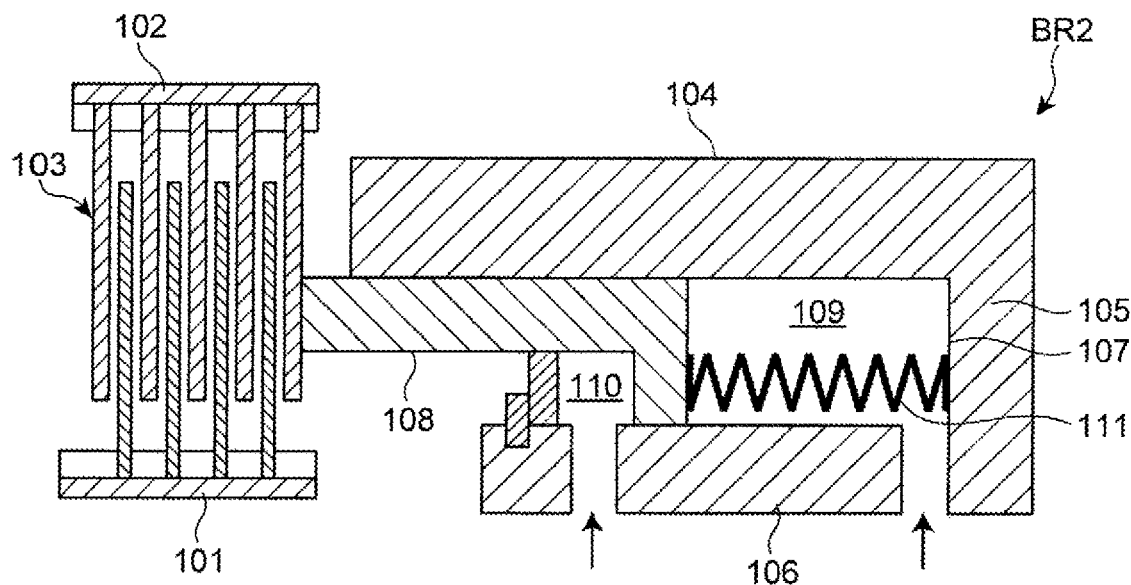
FIG. 2 is a table of fastening of friction fastening elements of an automatic transmission.
FIG. 3 is a view illustrating a second brake of the automatic transmission.

With the above-described configuration, the automatic transmission 10 forms, by combination of fastening states of the first clutch CL1, the second clutch CL2, the third clutch CL3, the first brake BR1, and the second brake BR2, first to eight gears in a D-range (forward) and a reverse gear in an R-range (reverse), as illustrated in FIG. 2.

In FIG. 2, the fastening state for the first clutch CL1, the second clutch CL2, the third clutch CL3, the first brake BR1, and the second brake BR2 is indicated by a circle mark, and slip control performed upon the start of the vehicle for the second brake BR2 at the first gear in the D-range and the reverse gear in the R-range is indicated by a triangle mark. The second brake BR2 functions as a vehicle-start friction fastening element to be fastened after fastening of other friction fastening elements forming the gear stage upon the vehicle start.

The second brake BR2 is slip-controlled upon the start of the vehicle. The second brake BR2 biases, by a spring, a piston from a release position to a zero clearance position at which the multiple friction plates are in a zero clearance state, and biases the piston from the zero clearance position to a fastening position by fastening hydraulic pressure to fasten the multiple friction plates.

FIG. 3 is a view illustrating the second brake of the automatic transmission. As illustrated in FIG. 3, the second brake BR2 has a hub member 101, a drum member 102 as a rotary member, multiple friction plates 103, an outer tubular portion 104, and a piston 108. The hub member 101 is joined to the transmission case 11. The drum member 102 is joined to the ring gear R3 of the third gear set PG3. The multiple friction plates 103 are arranged between the hub member 101 and the drum member 102. The outer tubular portion 104 is joined to the transmission case 11. The piston 108 is fitted in a cylinder 107 formed by a bottom portion 105 and an inner tubular portion 106, thereby fastening the multiple friction plates 103.

Moreover, the second brake BR2 has a fastening hydraulic chamber 109 and a releasing hydraulic chamber 110. The fastening hydraulic pressure for biasing the piston 108 in a fastening direction is supplied to the fastening hydraulic chamber 109. Releasing hydraulic pressure for biasing the piston 108 in a releasing direction is supplied to the releasing hydraulic chamber 110. A spring 111 is arranged in the fastening hydraulic chamber 109. The spring 111 biases, in the fastening direction, the piston 108 from the release position to the zero clearance position at which the multiple friction plates 103 are in the zero clearance state.

The second brake BR2 is configured such that the piston 108 is biased to the zero clearance position by the spring 111 and is moved to the fastening position and fastened by supply of the fastening hydraulic pressure to the fastening hydraulic chamber 109. Moreover, the second brake BR2 is configured such that in such a manner that the fastening hydraulic pressure is discharged from a state in which the piston 108 is at the fastening position and the releasing hydraulic pressure is supplied to the releasing hydraulic chamber 110, the piston 108 is moved to the zero clearance position and is released after having been further moved to the release position against biasing force of the spring 111.

On the other hand, each of the first clutch CL1, the second clutch CL2, the third clutch CL3, and the first brake BR1 has a hub member, a drum member, multiple friction plates, a piston, a fastening hydraulic chamber to which the fastening hydraulic pressure for biasing the piston in a fastening direction is supplied, and a spring. The multiple friction plates are arranged between the hum member and the drum member. The piston fastens the multiple friction plates. The spring biases the piston in a releasing direction.

Each of the first clutch CL1, the second clutch CL2, the third clutch CL3, and the first brake BR1 is configured such that the piston is moved to a fastening position against biasing force of the spring and is fastened by supply of the fastening hydraulic pressure to the fastening hydraulic chamber and the piston is moved to a release position and is released by the spring by discharging of the fastening hydraulic pressure.

The automatic transmission 10 is in a neutral state in a P-range (parking) and an N-range (neutral), and is configured such that among the multiple rotary elements forming the power transmission path, multiple rotary elements other than a rotary element coupled to the input shaft 12 and a rotary element coupled to the output shaft 13 are in a non-restraining state.

Figure 4:
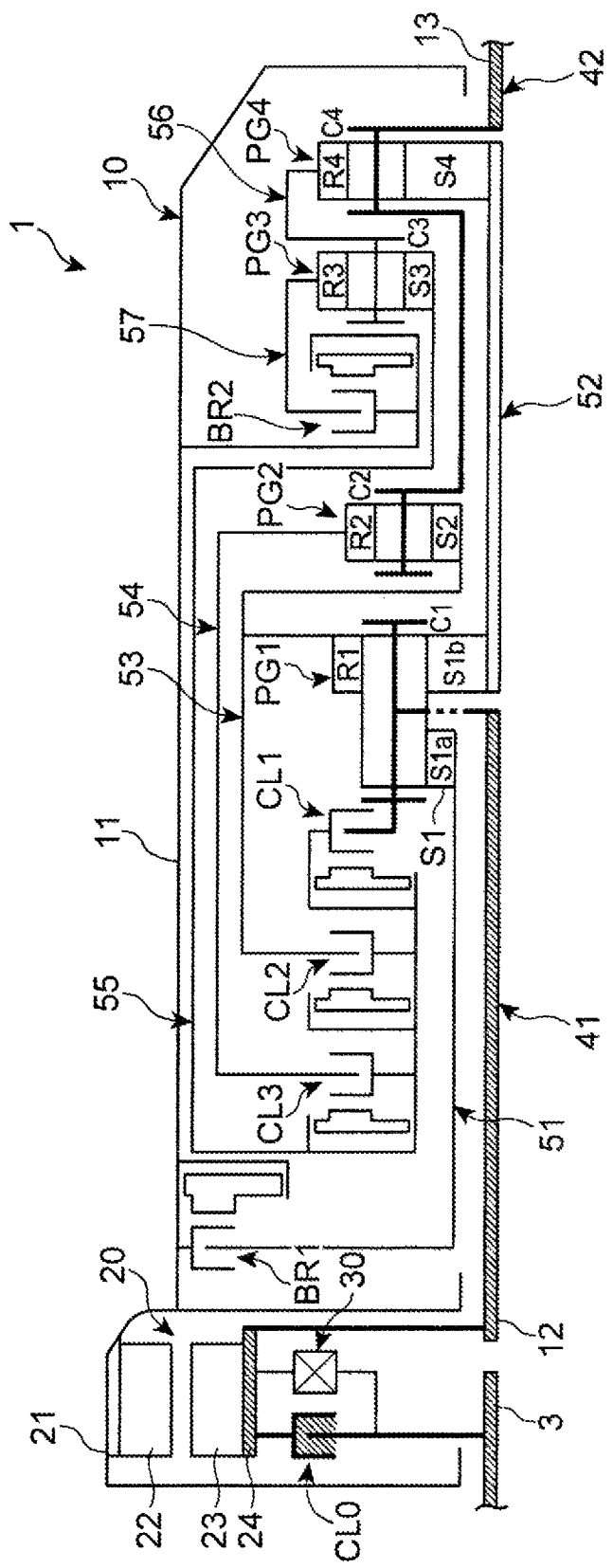
FIG. 4 is a view illustrating a fastening state of the power train device before the start of an engine.

FIG. 4 is a view illustrating a fastening state of the power train device before the start of the engine. As illustrated in FIG. 4, before the start of the engine having selected the P-range, in a state in which the power disconnection/connection clutch CL0 is fastened, the automatic transmission 10 has multiple rotary elements in the non-restraining state other than a rotary element 41 coupled to the input shaft 12 and a rotary element 42 coupled to the output shaft 13, specifically a first rotary element 51, a second rotary element 52, a third rotary element 53, a fourth rotary element 54, a fifth rotary element 55, a sixth rotary element 56, and a seventh rotary element 57.

The first rotary element 51 is a rotary element including the first sun gear S1a and a rotary element of the first brake BR1, the second rotary element 52 is a rotary element including the second sun gear S1b and the sun gear S4, the third rotary element 53 is a rotary element including the ring gear R1, the sun gear S2, and an outer rotary element of the second clutch CL2, the fourth rotary element 54 is a rotary element including the ring gear R2 and an outer rotary element of the third clutch CL3, the fifth rotary element 55 is a rotary element including the sun gear S3, an outer rotary element of the first clutch CL1, and inner rotary elements of the second clutch CL2 and the third clutch CL3, the sixth rotary element 56 is a rotary element including the carrier C3 and the ring gear R4, and the seventh rotary element 57 is a rotary element including the ring gear R3 and a rotary element of the second brake BR2.

The rotary element of the planetary gear mechanism in the non-restraining state when the automatic transmission 10 is in the neutral state is stopped or rotated in association with rotation of other rotary elements, and accordingly, power is transmitted from the input shaft 12 of the automatic transmission 10 to the output shaft 13 of the automatic transmission 10. In a case where the inertial mass of the rotary element of the planetary gear mechanism in the non-restraining state when the automatic transmission 10 is in the neutral state increases, when the torque fluctuation of the engine 2 is transmitted from an input element of the planetary gear mechanism on an input shaft side of the automatic transmission 10 upon the start of the engine, there is a probability that such a rotary element serves as a reaction element and the torque fluctuation is transmitted to an output element of the planetary gear mechanism on an output shaft side of the automatic transmission 10 and is transmitted to the output shaft 13 of the automatic transmission 10.

For example, when the torque fluctuation of the engine 2 is input from the input shaft 12 of the automatic transmission 10 to the carrier C1 of the first gear set PG1, in a case where the inertial masses of the first rotary element 51 and the second rotary element 52 are great, there is a probability that the first sun gear S1a and the second sun gear S1b of the first gear set PG1 serve as reaction elements and the torque fluctuation is transmitted to the ring gear R1 of the first gear set PG1. When the torque fluctuation of the engine 2 is transmitted to the sun gear S2 of the second gear set PG2 constantly coupled to the ring gear R1 of the first gear set PG1, in a case where the inertial mass of the fourth rotary element 54 is great, there is a probability that the ring gear R2 of the second gear set serves as a reaction element and the torque fluctuation is transmitted to the carrier C2 of the second gear set PG2 and is transmitted to the output shaft 13 constantly coupled to the carrier C2. On the other hand, in the present embodiment, such a problem is avoided in such a manner that the rotary elements including the rotary element of the brake in the non-restraining state when the automatic transmission 10 is in the neutral state upon the start of the engine are fixed.

Figure 5:
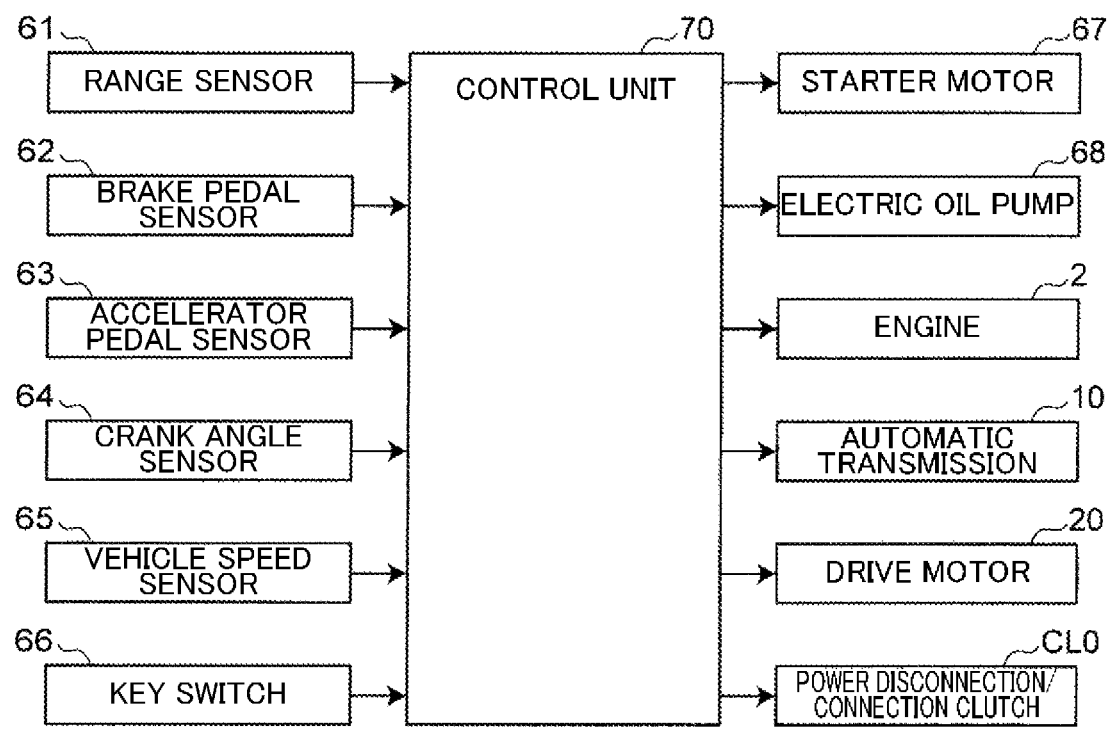
FIG. 5 is a control system diagram of the power train device.

FIG. 5 is a control system diagram of the power train device. As illustrated in FIG. 5, the power train device 1 includes, for example, a range sensor 61, a brake pedal sensor 62, an accelerator pedal sensor 63, a crank angle sensor 64, a vehicle speed sensor 65, and a key switch 66. The range sensor 61 detects the range of a shift lever selected by operation of a driver. The brake pedal sensor 62 detects the amount of pressing down of a brake pedal by the driver. The accelerator pedal sensor 63 detects the amount of pressing down of an accelerator pedal by the driver. The crank angle sensor 64 detects the rotation angle and rotation speed of the crankshaft of the engine 2. The vehicle speed sensor 65 detects the speed of the vehicle. The key switch 66 starts the engine 2.

Moreover, the power train device 1 includes, as described above, the engine 2, the automatic transmission 10, the drive motor 20, and the power disconnection/connection clutch CL0, and also includes the starter motor 67 and an electric oil pump 68. The starter motor 67 rotates and starts the engine 2. The electric oil pump 68 is driven by a not-shown motor. The automatic transmission 10 includes a hydraulic control circuit. The hydraulic control circuit has a mechanical oil pump to be driven by the engine 2 to control the hydraulic pressure to be supplied to each friction fastening element.

Moreover, the power train device 1 includes a control unit 70. The control unit 70 comprehensively controls a configuration relating to the power train device 1. Signals from the range sensor 61, the brake pedal sensor 62, the accelerator pedal sensor 63, the crank angle sensor 64, the vehicle speed sensor 65, the key switch 66, etc. are input to the control unit 70.

Based on these signals, the control unit 70 controls the starter motor 67, the electric oil pump 68, the engine 2, the automatic transmission 10, the drive motor 20, the power disconnection/connection clutch CL0, etc., and controls the hydraulic pressure to be supplied to the friction fastening elements CL1, CL2, CL3, BR1, BR2 of the automatic transmission 10 and the power disconnection/connection clutch CL0. Note that the control unit includes a microcomputer as a main section.

Figure 6:
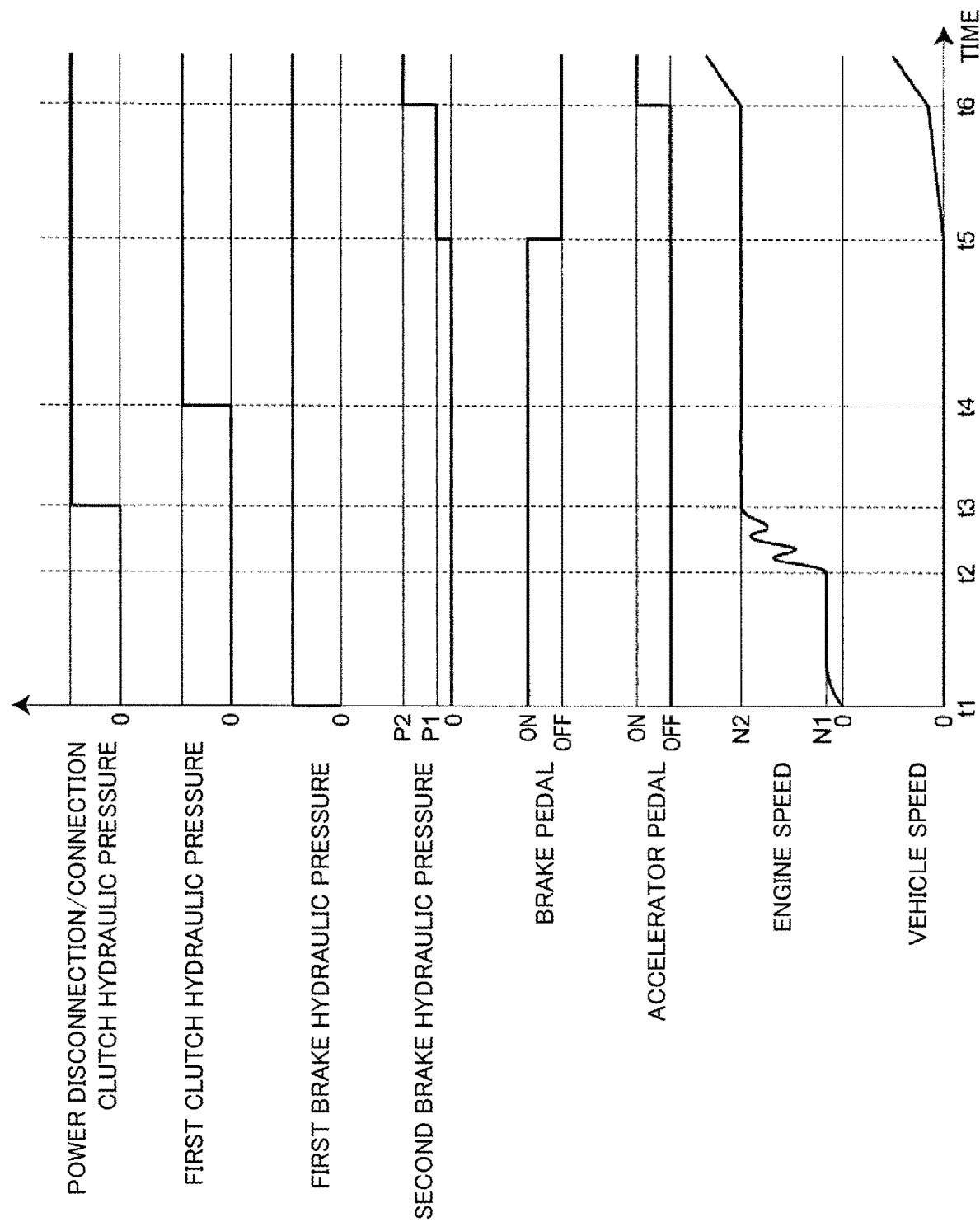
FIG. 6 is a time chart for describing control of the power train device.

FIG. 6 is a time chart for describing control of the power train device. The time chart illustrated in FIG. 6 illustrates a state in which the engine 2 is started from an ON state of the key switch 66 during parking of the vehicle to supply the hydraulic pressure to the friction fastening elements CL1, CL2, CL3, BR1, BR2 of the automatic transmission 10 and the power disconnection/connection clutch CL0 and the vehicle takes off accordingly.

In a case where the P-range is selected, a pressing-down state (an ON state) in which the operation of pressing down the brake pedal has been performed is brought, a non-pressing-down state (an OFF state) in which the operation of canceling pressing-down of the accelerator pedal has been performed is brought, and a fastening state in which the power disconnection/connection clutch CL0 has been fastened is brought, when the key switch 66 is turned on at time t1 as illustrated in FIG. 6, the control unit 70 performs engine start control. The control unit 70 rotates the engine 2 by the starter motor 67 such that an engine speed increases to a predetermined cranking rotation speed N1 such as 150 rpm.

Moreover, the control unit 70 supplies the fastening hydraulic pressure to the first brake BR1 by the electric oil pump 68 to fasten the first brake BR1. When a crank angle as the rotation angle of the crankshaft of the engine 2 is detected at time t2, the control unit 70 begins starting the engine 2. The control unit 70 controls the engine 2 such that fuel is supplied to and ignited in the engine 2 and the engine speed increases to a predetermined idling rotation speed N2 such as 800 rpm. When the start of the engine 2 begins, rotation of the engine 2 by the starter motor 67 ends. In the power train device 1, the engine 2 is controlled such that the idling rotation speed N2 is brought within a predetermined period after ignition of the engine 2.

Figure 7:
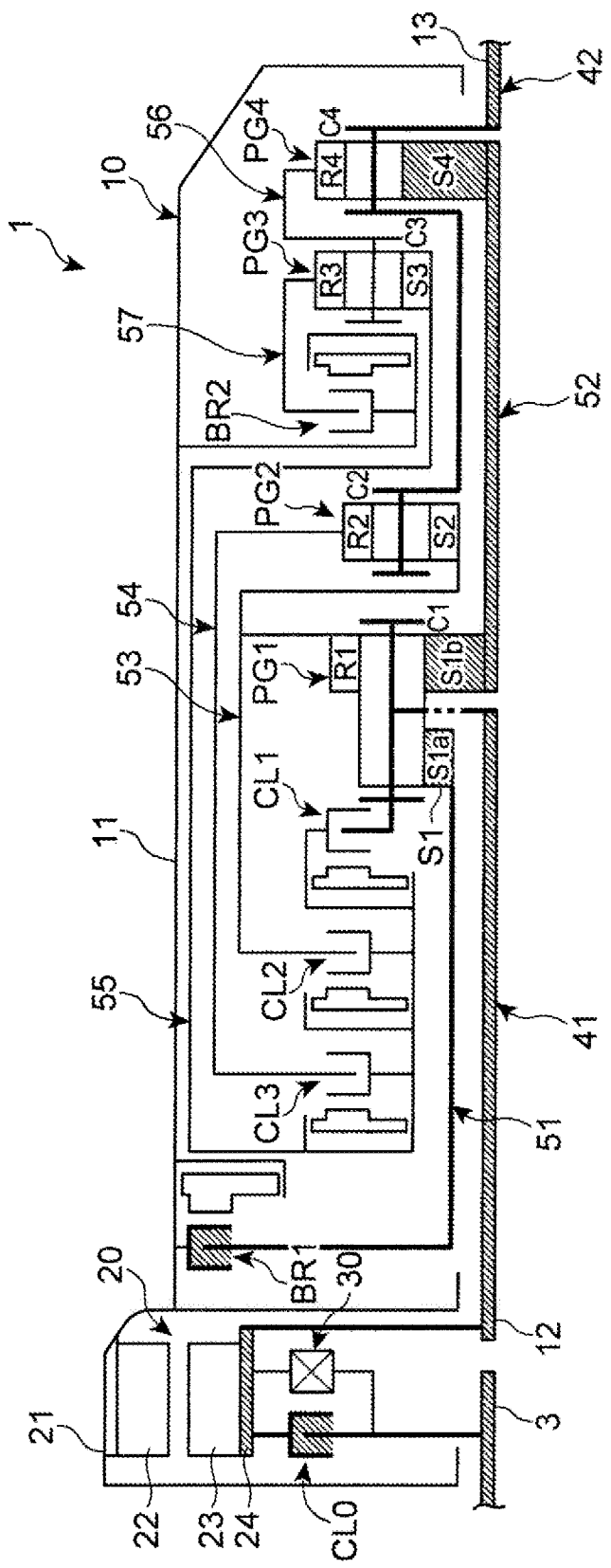
FIG. 7 is a view illustrating the fastening state of the power train device upon the start of the engine.

FIG. 7 is a view illustrating the fastening state of the power train device upon the start of the engine. When the start of the engine 2 begins at the time t2, the power disconnection/connection clutch CL0 is fastened, and therefore, the torque fluctuation of the engine 2 is transmitted to the input shaft 12 of the automatic transmission 10. However, the control unit 70 fastens the first brake BR1 before a fuel supply upon the start of the engine. In this manner, as illustrated in FIG. 7, the first rotary element 51 including the rotary element of the first brake BR1 in the non-restraining state when the automatic transmission 10 is in the neutral state is fixed, and accordingly, the second rotary element 52 is also fixed. Thus, the inertial mass is reduced.

When the engine 2 increases the idling rotation speed N2 at time t3, complete explosion of the engine 2 is obtained, and the start of the engine 2 is completed. The control unit 70 performs idling operation control of the engine 2 after the start of the engine. After the start of the engine, the control unit 70 stops actuation of the electric oil pump 68, and supplies the fastening hydraulic pressure to the first brake BR1 by the mechanical oil pump to fasten the first brake BR1.

Moreover, after the start of the engine, the control unit 70 supplies the releasing hydraulic pressure to the power disconnection/connection clutch CL0 by the mechanical oil pump to release the power disconnection/connection clutch CL0. After the start of the engine, power is transmitted from the engine 2 to the automatic transmission 10 through the one-way clutch 30.

Then, when the driver performs operation from the P-range to the D-range by way of the N-range at time t4, the control unit 70 supplies the fastening hydraulic pressure to the first clutch CL1 forming the first gear of the gear stage by the mechanical oil pump, thereby fastening the first clutch CL1.

Figure 8:
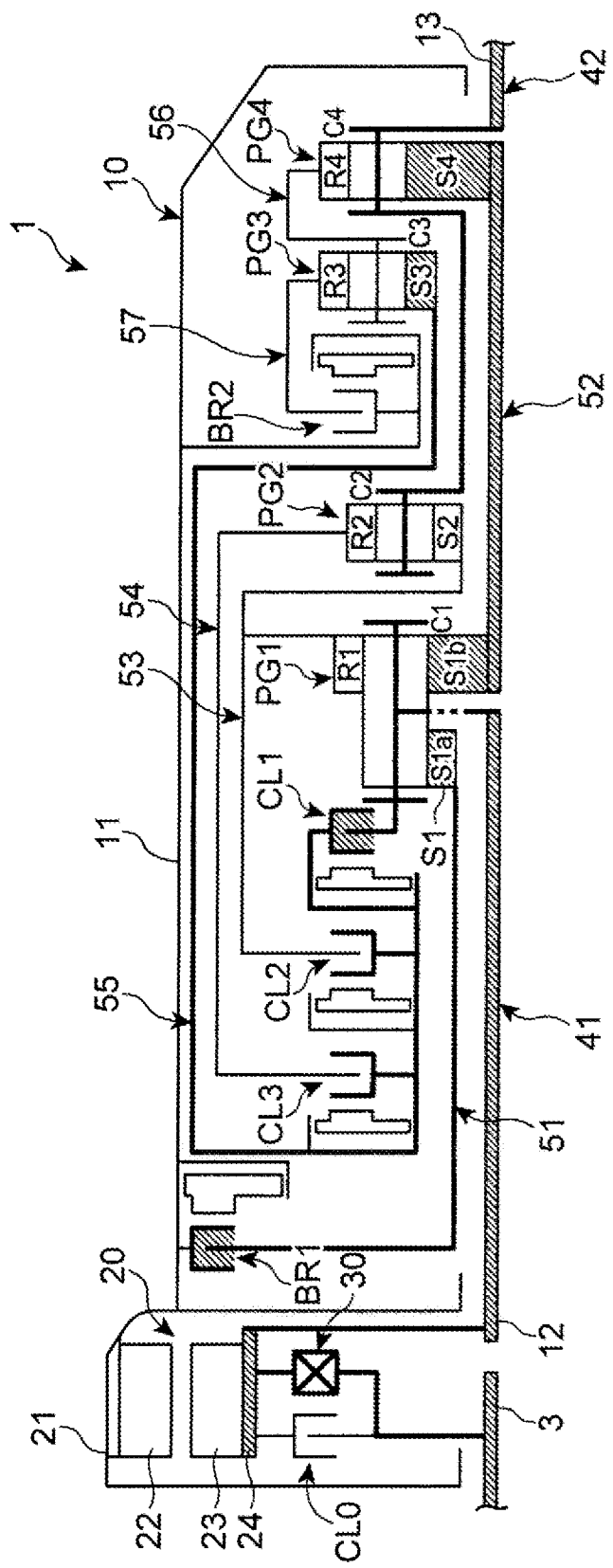
FIG. 8 is a view illustrating the fastening state of the power train device upon the start of the engine.

FIG. 8 is a view illustrating the fastening state of the power train device after the start of the engine. As illustrated in FIG. 8, the control unit 70 fastens the first clutch CL1 at the time t4, and in this manner, the fifth rotary element 55 in the non-restraining state when the automatic transmission 10 is in the neutral state is coupled to the rotary element 41 coupled to the input shaft 12.

As illustrated in FIG. 6, when the operation of canceling pressing-down of the brake pedal is performed at time t5, the control unit 70 supplies a predetermined slip hydraulic pressure P1 lower than a predetermined fastening hydraulic pressure P2 to the second brake BR2, thereby performing slip control for the second brake BR2. When the slip hydraulic pressure P1 is supplied to the second brake BR2, the second brake BR2 is brought into a slip state from the zero clearance state, and part of power of the engine 2 is transmitted from the engine 2 to the drive wheel. Then, the start of the vehicle begins.

When the operation of pressing down the accelerator pedal is performed at time t6, the control unit 70 supplies the fastening hydraulic pressure P2 to the second brake BR2 to fasten the second brake BR2. When the second brake BR2 is fastened, the engine 2 and the automatic transmission 10 are controlled to an engine speed and a vehicle speed corresponding to the operation of pressing down the accelerator pedal.

Moreover, the control unit 70 controls the motor 20 in a predetermined operation state, and causes the motor 20 to drive the drive wheel. The control unit 70 can control the motor 20 in a state in which the power disconnection/connection clutch CL0 is released such that the drive wheel is driven only by the motor 20.

In the present embodiment, the case where selection from the P-range to the D-range by way of the N-range is performed by the driver upon the start of the vehicle has been described. In a case where operation from the P-range to the R-range is performed at the time t4, control similar to that in the case of selecting the D-range is performed, except that the fastening hydraulic pressure is supplied to the third clutch CL3 forming the reverse gear of the shift stage by the mechanical oil pump to fasten the third clutch CL3.

As described above, in the present embodiment, in the power train device 1 of the vehicle including the engine 2 and the automatic transmission 10, the automatic transmission 10 is configured such that in the neutral state, the multiple rotary elements other than the rotary element 41 coupled to the input shaft 12 and the rotary element 42 coupled to the output shaft 13 are in the non-restraining state. These multiple rotary elements include the rotary element of the predetermined brake BR1, and the predetermined brake BR1 is fastened before a fuel supply upon the start of the engine.

With this configuration, the rotary element 51 including the rotary element of the predetermined brake BR1 in the non-restraining state when the automatic transmission 10 is in the neutral state is fixed before a fuel supply upon the start of the engine. As compared to a case where the predetermined brake BR1 is not fastened, when the torque fluctuation of the engine 2 is input to the automatic transmission 10 upon the start of the engine, the inertial mass of the rotary element as the reaction element against the torque fluctuation of the engine 2 is reduced. The torque fluctuation of the engine 2 transmitted to an output side of the automatic transmission 10 upon the start of the engine can be reduced.

Moreover, the clutch CL0 fastened upon a non-supply of the hydraulic pressure and released upon a supply of the hydraulic pressure is provided between the engine 2 and the automatic transmission 10, and is fastened upon the start of the engine. With this configuration, in the case of providing the normal close type clutch CL0 between the engine 2 and the automatic transmission 10, the torque fluctuation of the engine 2 transmitted to the output side of the automatic transmission 10 upon the start of the engine can be reduced.

Further, the predetermined brake BR1 is fastened by the electric oil pump 68 before a fuel supply upon the start of the engine. With this configuration, the hydraulic pressure can be supplied to the predetermined brake BR1 by means of the electric oil pump 68 before the start of the engine 2, and the predetermined brake BR1 can be fastened.

In addition, the predetermined brake BR1 is fastened before a fuel supply upon the start of the engine, and is also fastened after the start of the engine. With this configuration, even after the start of the engine, the inertial mass of the rotary element as the reaction element against the torque fluctuation of the engine 2 can be reduced, and the torque fluctuation of the engine 2 transmitted to the output side of the automatic transmission 10 can be reduced.

Figure 9:
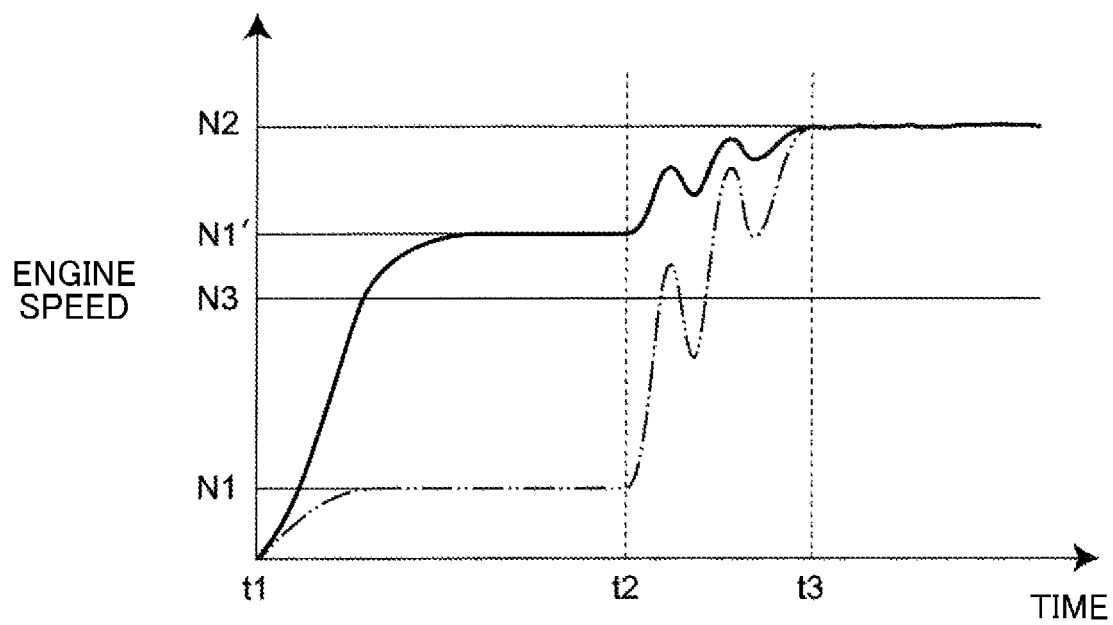
FIG. 9 is a view for describing a power train device of a vehicle according to a second embodiment.

FIG. 9 is a graph for describing a power train device of a vehicle according to a second embodiment. FIG. 9 illustrates, by a solid line and a chain double-dashed line, the engine speed upon the start of the engines of the power train devices according to the first embodiment and the second embodiment.

The power train device according to the second embodiment is configured such that the engine 2 is rotated using the motor 20 instead of the starter motor 67 in the power train device 1 according to the first embodiment upon the start of the engine. A configuration different from that of the power train device 1 according to the first embodiment will be described.

As illustrated in FIG. 9, in the power train device according to the second embodiment, in a case where the P-range is selected, the brake pedal is in the pressing-down state, the accelerator pedal is in the non-pressing-down state, and the power disconnection/connection clutch CL0 is in the fastening state, when the key switch 66 is turned on at the time t1, the control unit 70 also performs the engine start control.

In the second embodiment, since the power disconnection/connection clutch CL0 is fastened upon the start of the engine, the control unit 70 rotates the engine 2 by the motor 20 to increase the engine speed to a predetermined cranking rotation speed N1' such as 600 rpm.

In the power train device according to the second embodiment as indicated by the solid line of FIG. 9, the engine 2 is rotated such that the engine speed becomes greater than that of the power train device 1 according to the first embodiment as indicated by the double-dashed line of FIG. 9, thereby increasing the engine speed to the cranking rotation speed N1' as higher rotation than a predetermined resonant rotation speed N3, such as 400 rpm, with which a drive system, including a propeller shaft and a differential device, from the engine 2 to the drive wheel is resonated by the motor 20.

Moreover, in the second embodiment, the control unit 70 also supplies the fastening hydraulic pressure to the first brake BR1 by the electric oil pump 68 to fasten the first brake BR1. When the crank angle of the engine 2 is detected at the time t2, the start of the engine 2 begins, and fuel is supplied to and ignited in the engine 2. Then, the control unit 70 controls the engine 2 such that the engine speed increases to the predetermined idling rotation speed N2 such as 800 rpm. In the power train device according to the second embodiment, the engine 2 is also controlled to the idling rotation speed N2 within the predetermined period after ignition of the engine 2.

When the start of the engine 2 begins at the time t2, the power disconnection/connection clutch CL0 is fastened. Thus, the torque fluctuation of the engine 2 is transmitted to the input shaft 12 of the automatic transmission 10. Since the control unit 70 fastens the first brake BR1 before a fuel supply upon the start of the engine, the first rotary element 51 including the rotary element of the first brake BR1 in the non-restraining state when the automatic transmission 10 is in the neutral state is fixed, and the second rotary element 52 is also fixed accordingly.

As described above, in the present embodiment, when the automatic transmission 10 is in the neutral state, the multiple rotary elements in the non-restraining state other than the rotary element 41 coupled to the input shaft 12 and the rotary element 42 coupled to the output shaft 13 include the rotary element of the predetermined brake BR1, and the predetermined brake BR1 is fastened before a fuel supply upon the start of the engine.

With this configuration, as compared to the case of not fastening the predetermined brake BR1, when the torque fluctuation of the engine 2 is input to the automatic transmission 10 upon the start of the engine, the torque fluctuation of the engine 2 transmitted to the output side of the automatic transmission 10 upon the start of the engine can be reduced.

Moreover, the motor 20 is provided between the engine 2 and the automatic transmission 10, the clutch CL0 and the one-way clutch 30 are provided in parallel between the engine 2 and the motor 20, and the power train device 1 of the vehicle is the power train device 1 of the hybrid vehicle configured such that the drive wheel is driven by at least one of the engine 2 or the motor 20.

With this configuration, in the power train device 1 of the hybrid vehicle, the engine 2 can be started by the motor 20 through the clutch CL0, and power can be transmitted to the automatic transmission 10 from the engine 2 through the one-way clutch 30 after the start of the engine. Thus, as compared to the case of transmitting power to the automatic transmission 10 from the engine 2 through the clutch CL0 without using the one-way clutch 30, the transmission torque capacity of the clutch CL0 can be decreased, and the clutch CL0 can be configured compact.

In the present embodiment, upon the start of the engine, the engine 2 is started after the motor 20 increases the engine speed to the predetermined cranking rotation speed N1' as higher rotation than the predetermined resonant rotation speed N3 with which the drive system from the engine 2 to the drive wheel resonates and lower rotation than the predetermined idling rotation speed N2.

With this configuration, as compared to the case of starting the engine 2 with a lower engine speed than the resonant rotation speed of the drive system, a rotation speed difference between the cranking rotation speed N1' at the beginning of the start of the engine and the idling rotation speed N2 is decreased so that the torque fluctuation of the engine 2 input to the automatic transmission 10 upon the start of the engine can be reduced, and the torque fluctuation of the engine 2 transmitted to the output side of the automatic transmission 10 upon the start of the engine can be reduced. Moreover, an increase in vibration of the drive system due to resonance with the torque fluctuation of the engine 2 upon the start of the engine can be suppressed.

The technique disclosed herein is not limited to the exemplary embodiments, and various modifications and changes in design can be made without departing from the gist of the present invention.

What is claimed is:

1. A power train device of a vehicle, comprising:
   an engine; and
   an automatic transmission including multiple planetary gear mechanisms and multiple friction fastening elements and forming a power transmission path for transmitting power from the engine to a drive wheel,
   wherein the automatic transmission is configured such that in a neutral state, multiple ones of multiple rotary elements forming the power transmission path other than a rotary element coupled to an input member and a rotary element coupled to an output member are in a non-restraining state,
   the multiple ones of the multiple rotary elements include a rotary element of a predetermined brake among the multiple friction fastening elements,
   the predetermined brake is fastened before a fuel supply upon an engine start,
   a clutch to be fastened upon a non-supply of hydraulic pressure and released upon a supply of the hydraulic pressure is provided between the engine and the automatic transmission, and
   the clutch is fastened upon the engine start.

2. The power train device according to claim 1, further comprising:
   a motor configured to rotate the engine and drive the drive wheel,
   wherein the motor is provided between the engine and the automatic transmission,
   the clutch to be fastened upon the non-supply of the hydraulic pressure and released upon the supply of the hydraulic pressure and a one-way clutch configured to transmit power only to the motor are provided in parallel between the engine and the motor, and the power train device of the vehicle is a power train device of a hybrid vehicle configured such that the drive wheel is driven by at least one of the engine or the motor.

3. A power train device of a vehicle, comprising:

an engine; and an automatic transmission including multiple planetary gear mechanisms and multiple friction fastening elements and forming a power transmission path for transmitting power from the engine to a drive wheel, wherein the automatic transmission is configured such that in a neutral state, multiple ones of multiple rotary elements forming the power transmission path other than a rotary element coupled to an input member and a rotary element coupled to an output member are in a non-restraining state, the multiple ones of the multiple rotary elements include a rotary element of a predetermined brake among the multiple friction fastening elements, and the predetermined brake is fastened by an electric oil pump before a fuel supply upon an engine start.

4. The power train device according to claim 3, wherein the predetermined brake is fastened before the fuel supply upon the engine start, and is fastened after the engine start.

5. The power train device according to claim 3, further comprising:

a motor configured to rotate the engine and drive the drive wheel, wherein the motor is provided between the engine and the automatic transmission, a clutch to be fastened upon a non-supply of hydraulic pressure and released upon a supply of the hydraulic pressure and a one-way clutch configured to transmit power only to the motor are provided in parallel between the engine and the motor, and the power train device of the vehicle is a power train device of a hybrid vehicle configured such that the drive wheel is driven by at least one of the engine or the motor.

6. A power train device of a vehicle, comprising:

an engine;

an automatic transmission including multiple planetary gear mechanisms and multiple friction fastening elements and forming a power transmission path for transmitting power from the engine to a drive wheel; and a motor configured to rotate the engine, wherein the automatic transmission is configured such that in a neutral state, multiple ones of multiple rotary elements forming the power transmission path other than a rotary element coupled to an input member and a rotary element coupled to an output member are in a non-restraining state, the multiple ones of the multiple rotary elements include a rotary element of a predetermined brake among the multiple friction fastening elements, the predetermined brake is fastened before a fuel supply upon an engine start, and upon the engine start, the engine is started after the motor increases an engine speed to a predetermined cranking rotation speed as higher rotation than a predetermined resonant rotation speed with which a drive system from the engine to the drive wheel resonates and lower rotation than a predetermined idling rotation speed.

\* \* \* \* \*